United States Patent

Jurcso

[11] Patent Number: 5,104,679
[45] Date of Patent: Apr. 14, 1992

[54] DRESSING OR MARINADE OF THE MULTIPLE-PHASE SEPARATING TYPE

[75] Inventor: John F. Jurcso, Dublin, Calif.

[73] Assignee: The Clorox Company, Oakland, Calif.

[21] Appl. No.: 378,090

[22] Filed: Jul. 11, 1989

[51] Int. Cl.$^5$ .................... A23D 7/00; A23L 1/035
[52] U.S. Cl. ........................ 426/602; 426/604; 426/613; 426/654
[58] Field of Search ............ 426/330.6, 589, 602, 426/604, 654, 613, 557

[56] References Cited

U.S. PATENT DOCUMENTS

| | | | |
|---|---|---|---|
| 2,787,550 | 4/1957 | Struble et al. | 426/602 |
| 3,917,859 | 11/1975 | Terada et al. | 426/602 |
| 4,396,638 | 8/1983 | Edo et al. | 426/564 |
| 4,423,084 | 12/1983 | Trainor et al. | 426/589 |
| 4,451,493 | 5/1984 | Miller et al. | 426/602 |
| 4,513,017 | 4/1985 | Moran et al. | 426/603 |
| 4,515,825 | 5/1985 | Moran et al. | 426/603 |
| 4,533,254 | 8/1985 | Cook et al. | 366/176 |

Primary Examiner—Donald E. Czaja
Assistant Examiner—Helen Pratt
Attorney, Agent, or Firm—Majestic, Parsons, Siebert & Hsue

[57] ABSTRACT

A shakable, edible composition comprises a continuous aqueous phase having stably suspended first oil droplets. A second oil phase normally forms an upper layer contiguous with the continuous aqueous phase when the composition stands in a container, but the second oil phase is dispersible into the aqueous phase as second oil droplets upon sufficient shaking. The stably dispersed first oil droplets increase the ease of mixing the second oil phase with the aqueous phase and can provide improved organoleptic characteristics for compositions of the invention.

16 Claims, No Drawings

DRESSING OR MARINADE OF THE MULTIPLE-PHASE SEPARATING TYPE

FIELD OF THE INVENTION

The present invention generally relates to dressings of the two-phase oil-and-water type where the oil phase can be dispersed into the aqueous phase to form a coarse emulsion which may separate into two phases on standing, and more particularly relates to a shakable, edible composition useful as a dressing or marinade that is readily mixed upon shaking.

BACKGROUND OF THE INVENTION

Dressings for salads, such as lettuce, pasta or potato, generally can be categorized as being of a nonseparating type or of a separating type. Nonseparating dressings, such as mayonnaise, French or Thousand Island, often have a single continuous phase, and may have a dispersed oil phase. These dressings are stable emulsions of oil-in-water. These emulsified oil-in-water dressings do not (or are formulated or processed so that they should not) separate into two phases on standing. For example, U.S. Pat. No. 4,423,084, issued Dec. 27, 1983, inventors Trainor et al. discusses the composition and ingredients of mayonnaise and salad dressing, and discloses such a dressing said to have improved freeze-thaw stability.

Among the nonseparating dressings are those that include single phase aqueous dressings without oil (which do not separate since there is no oil).

Dressings of the two-phase separating type such as "Italian" or oil-and-vinegar, on shaking, become dispersed and can remain dispersed for a short period of time to permit dispensing. Such a dressing then reverts to the traditional two-phase form on standing and forms an upper oil layer and a lower aqueous layer. U.S. Pat. No. 4,451,493, issued May 29, 1984, inventors Miller et al., discloses such a non-homogenized, oil-and-water dressing in which a polyglycerol ester emulsifier is included to achieve what is described as a limited emulsion stability. By inclusion of this emulsifier, the compositions of U.S. Pat. No. 4,451,493 are said to become homogeneous and remain readily pourable as dispersed oil-and-water mixture, but with delayed subsequent phase separation.

Dressings of varied oil contents are produced commercially. Fully caloric dressings often have oil contents of about 30–60 wt. %, while many reduced oil or reduced calorie dressings have oil contents of about 15–30 wt. %. Low or no oil dressings often have oil contents of less than about 15 wt. %.

SUMMARY OF THE INVENTION

It is an object of the present invention to provide a dressing or marinade of the multiple-phase separating type having an increased ease of mixing the phases upon shaking, but which may revert to form separated layers upon sufficient standing.

It is another object of the present invention to provide a dressing or marinade with improved organoleptic characteristics. Other objects and advantages will become apparent to those skilled in the art to which the invention pertains.

In one aspect of the present invention, a shakable, edible composition comprises a continuous aqueous phase and a second oil phase. The continuous aqueous phase has stably suspended first oil droplets. Before shaking the second oil phase normally forms an upper layer contiguous with the continuous aqueous phase. The second oil phase is dispersible into the aqueous phase as second oil droplets upon sufficient shaking. In one embodiment, these second oil droplets revert to the second oil layer by coalescence upon sufficient standing, but the first oil droplets remain substantially dispersed in the continuous aqueous phase.

The first oil droplets of the inventive composition are relatively small with respect to those formed when the second oil phase is dispersed into the aqueous phase. It is the presence of the relatively small first oil droplets throughout the shaking and standing for compositions of the invention that appear to increase the ease of mixing the second oil phase with the aqueous phase and to provide improved organoleptic characteristics. In addition, some compositions of the invention provide good stabilization of proteinaceous ingredients such as buttermilk solids. When protein additives such as buttermilk solids, cheese powders and the like are optionally included, stabilizers may not be needed or their level may be reduced.

DETAILED DESCRIPTION OF THE PREFERRED EMBODIMENTS

Compositions of the invention are edible and can be mixed by shaking. To be mixable by shaking is meant that the inventive compositions can flow when shaken and, as a result, the oil phase can be dispersed in the aqueous phase. This typically requires the aqueous phase to have a viscosity of less than about 10,000 cPs (Brookfield RVT, 5 rpm).

The inventive composition is useful as a dressing, such as for potato, pasta or lettuce/spinach salads, and/or also as a marinade or sauce, such as for meats. A continuous aqueous phase of the composition has stably suspended first oil droplets therein. By stably suspended is meant that the first oil droplets do not significantly coalesce and form a separate oil phase, or join with the second oil phase during the shelf life of the product.

The first oil droplets may be maintained in suspension by use of one or more emulsifying or stabilizing agents. Suitable emulsifying, or stabilizing, agents for the first oil droplets include xanthan gum, egg yolk solids, whole egg solids, alginates, proteins such as caseinates and whey, polysorbates, and other emulsifiers or stabilizers known in the art. The size of the first oil droplets is also believed to be a factor, in combination with the type and amount of emulsifying agent, in maintaining the first oil droplets in a stable suspension. The first oil droplets typically have an average diameter of less than about $10\mu$, and may have a range between about $0.01\mu$ and about $250\mu$, typically about $0.5\mu$ to about $250\mu$, and preferably about $0.5\mu$ to about $50\mu$.

Stability of the first oil droplets in the continuous aqueous phase is also assisted when the first oil is added under high shear to the aqueous phase during composition preparation. Stability may also be assisted by the use of emulsifiers or stabilizers. Under some production conditions, it is believed possible to prepare stably suspended first oil droplets of the composition without use of an emulsifying agent. An example of a method for producing stably suspended first oil droplets without the use of an emulsifying or stabilizing agent may be as described in U.S. Pat. No. 4,533,254, issued Aug. 6, 1985, inventors Cook et al., incorporated by reference, where a turbulent jet interaction system can produce droplet diameters ranging between about 0.0μ to about 0.2μ.

The amount of emulsifying or stabilizing agent, when present, will vary depending upon the desired size of first oil droplets, manner of production, type of oil and presence of other components. As will be understood, relatively small amounts of emulsifying agent with respect to total first oil will be needed.

The first oil droplets, may be comprised of substantially any oil or fat having a melting point at or below about 60° F., more preferably below 32° F., and appropriate for this edible composition. For products to be chilled or refrigerated, a melting point of less than about 32° F. is desirable. Examples of the oils which can be used to form the first oil droplets are soybean oil, sunflower oil, cottonseed oil, corn oil, safflower oil, and hydrogenated and/or winterized versions of these oils.

The second oil, which will be more fully described hereinafter, may be the same as that forming the first oil droplets or may be different. Regardless of being the same oil or different oils, the compositions have a second oil phase that forms a layer separated from the first oil droplets when the composition stands in a container (and which is contiguous with the continuous aqueous phase) but is also readily dispersed into the continuous aqueous phase as second oil droplets.

The amount of first oil droplets is that which is effective to reduce the amount, or duration, of shaking needed to disperse the second oil phase into the continuous aqueous phase. The first oil droplets are also typically in an amount effective to increase the time for the second oil phase to return as a separated, upper layer following shaking of the composition when in a container. Both of these advantageous results can be achieved where the first oil total is in a range with respect to the total aqueous phase of between about 0.5 wt. % to about 55 wt. %, more preferably about 2 wt. % to about 45 wt. %. Too much of the first oil, as first oil droplets, with respect to the aqueous phase will lead to a tendency towards reversal of water as a continuous phase to first oil as a continuous phase or will lead to too high of a viscosity of the aqueous phase to allow for shaking. Too little of the first oil as first oil droplets will reduce the advantages.

Tests using a dye in the first oil droplets and no dye in the second oil droplets have shown very little coalescence of the first oil droplets with the second oil droplets when the second oil is dispersed in the aqueous phase and then allowed to separate.

The continuous aqueous phase typically has a pH not greater than about 4.6 and will preferably have a pH in the range of about 3 to about 4. A pH lower than 3 can be used, but an increased acid or sour taste may be obtained and consumer acceptability reduced. An acidic range is advantageous in preventing growth of bacteria or similar undesirable microorganisms. Thus, some acidic compositions of the invention need not be cooked to sterilize or to pasteurize to increase shelf stability. In addition, consumers are familiar with the acidic taste due to the traditional use of lemon juice, vinegar or the like acids in preparing Italian style dressings. Other components may be utilized to achieve the acidic pH, as can other pH adjusting agents such as acetic acid, citric acid, phosphoric acid and lactic acid. Preservatives such as are well known to the art may also be used to limit microbial growth.

If desired, proteinaceous ingredients such as buttermilk solids, cheese powders and/or non-protein ingredients such as flavors, spices, seasonings, vegetable powders/extracts, fruit powders and the like may be added to the aqueous phase. These other proteinaceous components, flavorings and seasonings can be added in amounts ranging up to the order of about 20 wt. % with respect to the aqueous phase. Among the advantages provided by some compositions of the invention is that protein or protein-containing additives are found to be distributed more evenly and stably in the aqueous phase.

As earlier noted, the second oil can be the same as the oil constituting the first oil droplets or can be different. The second oil typically is in an amount of about 5 wt. % to about 55 wt. %, preferably about 5 wt. % to about 50 wt. %, with respect to the total composition. The combined total of second oil and first oil is preferably in a weight ratio of between about 5 wt. % to about 75 wt. % of the total composition. The second oil component, upon shaking of the composition, readily forms a coarse oil emulsion with relatively large, second oil droplets having typical droplet diameters of about 70μ to about 500μ or larger.

Two embodiments of the invention differ in their behavior after shaking and dispersing of the second oil into the aqueous phase. In one embodiment, the composition reverts to two separate layers upon sufficient standing. In another embodiment, the composition does not revert to separated layers upon standing.

If it is desired for the second oil droplets to coalesce into a separated, upper layer upon sufficient standing of the composition in a container, then the viscosity of the aqueous phase should be at a low enough level to permit this. Likewise, the emulsifying or stabilizing agent, if present, should be at a low enough level to permit the separation.

In the second embodiment (where the dressing or marinade does not revert to separated layers upon standing) the continued dispersion of second oil in the aqueous phase is believed to depend on a number of factors. For example, increased viscosity of the aqueous phase will hinder the separation as will very vigorous shaking when higher amounts of emulsifying agent are present.

The aqueous phase is typically between 45 wt. % to about 95 wt. % of the total composition, preferably between about 50 wt. % and about 95 wt. % of the total composition.

Compositions of the invention will now be further illustrated by the following examples, which are meant as illustrative rather than limiting.

EXAMPLE I

Two dressings having the same bulk formula weight compositions were prepared. One of the these compositions was a particularly preferred embodiment of the invention designated inventive composition (a). The other of these compositions (comparative composition (b)) is not within the scope of the invention since there was no first oil component, but was for comparison. Although there was no first oil for comparative composition (b), an equivalent amount of oil was added to the second oil component to keep the total oil equivalent for comparison purposes. The compositions had the components as set out in Table I.

TABLE I

| Component | Wt. % Inventive Comp. (a) | Wt. % Comparative Comp. (b) |
|---|---|---|
| Water | 35.00 | 35.00 |
| First oil component[1] | 5.00 | — |
| Second oil component[2] | 45.00 | 50.00 |
| Vinegar (300 grain) | 5.00 | 5.00 |
| Buttermilk solids | 2.50 | 2.50 |
| Salt | 2.00 | 2.00 |
| Sugar | 2.00 | 2.00 |
| Xanthan gum | 0.10 | 0.10 |
| Flavoring/herbs/spices | 3.40 | 3.40 |
| | 100.00 | 100.00 |

[1] soybean oil
[2] soybean oil

The weight of each composition (i.e., the inventive composition (a) and comparative composition (b)) was 245 grams. These compositions were prepared as follows:

Method of Preparation for Inventive Composition (a)

The xanthan gum was dispersed in the water using a Waring Blender (Model 7010) at the highest speed with a Polystron Roto-stator (Model BEW-5) attachment for one minute. The buttermilk solids were added to this dispersion and mixed for one minute. The first oil component was then added and mixed for another one minute. The admixture so formed was then transferred to another, larger container and using a Lightnin mixer (Model L, 1750 rpm, two inch three bladed propeller (45° pitch) with a stainless steel shaft), the remaining ingredients except for the second oil component were added and mixed for 15 minutes. The vinegar was then added slowly over a one minute time period with mixing continued for an additional four minutes. This resulted in the continuous aqueous phase of the invention having stably suspended first oil droplets therein. The second oil component was then simply poured onto this aqueous phase so as to not disturb the aqueous phase.

Preparation of Comparative Composition (b)

The same procedure was used in forming comparative composition (b) as just described for inventive composition (a), except that no first oil component was added as described. Instead, all of the oil was added after the aqueous phase (including vinegar, buttermilk solids and so forth) had been prepared.

Comparison

In a direct comparison between comparative composition (b), and inventive composition (a), the inventive composition (a) containing first oil droplets was more easily mixed by shaking than the comparative composition (b). The inventive composition (a) separated more slowly than the comparative composition (b). In addition, the inventive composition (a) was perceived as having the following improved flavor and textural characteristics: increased dairy-like flavor notes, smoother, more well-rounded flavor profile, increased creamy/richer mouth feel and textural properties, and reduced acid flavor notes.

EXAMPLE II

A second inventive composition was prepared and designated inventive composition (c). This composition was the same as inventive composition (a) described in Example I, except that inventive composition (c) had 1 wt. % of the first oil component (soybean oil) and had 49 wt. % of the second oil component (soybean oil). The two inventive compositions (a) and (c) and the comparative composition (b), as above described, were then allowed to stand a minimum of 24 hours before shake tests were conducted.

Mechanical shake tests were conducted by attaching equally filled bottles on a Burrel wrist-action shaker. The three composition samples were shaken at an intensity setting of 5 for fifteen seconds. Shaking efficiency was documented by photographs and evaluated on a scale of 1–4 as follows:

A value of "1" means no noticeable dispersion of upper oil into the aqueous phase.

A value of "2" means that approximately one-third of the upper oil was dispersed in the aqueous phase.

A value of "3" means that approximately two-thirds of the upper oil was dispersed in the aqueous phase.

A value of "4" means that virtually all of the upper oil was dispersed in the aqueous phase.

Results of the shaking tests as just described are set out in Table II.

TABLE II

| | Shaking Scale Value |
|---|---|
| Inventive Composition (a) | 4 |
| Inventive Composition (c) | 4 |
| Comparative Composition (b) | 1 |

As can be seen from this shaking study, both inventive compositions (a) and (c) resulted in having virtually all of the upper oil dispersed in the aqueous phase upon the fifteen seconds shaking. By contrast, the comparative composition (b) had no noticeable dispersion of the upper oil into the aqueous phase upon the same shaking.

EXAMPLE III

The two compositions prepared as in Example I were also evaluated for stabilization characteristics of proteinaceous ingredients such as buttermilk solids. The following factors were evidenced by the comparative composition (b):

The unshaken product, when left stand at 70° F. for one week, developed a cracked/streaked appearance and developed a clear layer of water at the bottom of the aqueous phase. This apparent "weepage" in the aqueous phase is believed due to non-stabilized protein coagulation;

The shaken product, when left stand at 70° F. for one week, developed a coagulated layer of protein at the oil/water interface; and, mouth feel evaluation indicated non-stabilized proteins because coagulated proteins form a gum-like feel on the tongue and teeth.

However, when inventive composition (a) samples were analogously studied for stabilization characteristics, there were no such indications of non-stabilized proteins.

EXAMPLE IV

The same two inventive compositions (a) and (c) and the comparative composition (b), as earlier described, were taste-tested by several persons. Inventive composition (a) was judged as having the highest level of dairy flavor with a creamy texture and reduced acid note upon shaking; inventive composition (c) was apprehended as having a slightly increased dairy flavor with creamy texture and slightly reduced acid note; however, comparative composition (b) was adjudged as having no creamy textural characteristic notes and having a significantly higher acid note than either of the inventive compositions.

EXAMPLE V

Another inventive composition and another (noninventive) comparative composition were prepared having the formulas set out in Table III.

TABLE III

| Component | Wt. % Inventive Comp. (d) | Wt. % Comparative Comp. (e) |
| --- | --- | --- |
| Water | 42.50 | 42.50 |
| First oil component[1] | 5.00 | — |
| Second oil component[2] | 37.50 | 42.50 |
| Vinegar (300 grain) | 5.00 | 5.00 |
| Buttermilk solids | 2.50 | 2.50 |
| Salt | 2.00 | 2.00 |
| Sugar | 2.00 | 2.00 |
| Xanthan gum | 0.10 | 0.10 |
| Flavoring/herbs/spices | 3.40 | 3.40 |
| | 100.00 | 100.00 |

[1]soybean oil
[2]soybean oil

The inventive composition (d) and the comparative composition (e) were prepared in an analogous manner to the earlier described inventive compositions and comparative composition.

After standing for a minimum of 24 hours, these two compositions were then evaluated for their ability to return to the original, two-phase form. Both compositions were shaken by hand to yield equivalent shaking efficiency of the earlier described shaking values (and where second oil component droplets had diameters of about 0.5 to about 1.0 mm). The products were allowed to stand approximately thirty minutes after shaking with the following results:

Inventive composition (d) was judged with a value of "3.5" (on the earlier described 1–4 scale); however, comparative composition (e) was evaluated as "1.5" (again on the earlier described 1–4 scale).

EXAMPLE VI

An inventive composition analogous to inventive composition (d) was prepared, except that an oil soluble dye ($\beta$-carotene) was added to the first oil component before composition preparation. The mixture was placed in a bottle and shaken up and down ten times by hand to disperse the second oil component into the aqueous phase. The dispersion was then allowed to separate. Measurement of the dye level by optical spectroscopy showed that less than 5% of the dyed oil from the first component had coalesced with the second oil component.

EXAMPLE VII

An altered version of inventive composition (d) was prepared (and hereinafter designated the inventive composition ($d_1$). The difference was that the first mixing time was reduced from one minute to five seconds in the Waring blender for inventive composition ($d_1$). Such reduced mixing time produced a larger average droplet size and a greater range in droplet sizes. The two inventive compositions (d) and ($d_1$) and the comparative composition (e) were then shaken as described in Example II. Table IV sets out the results.

TABLE IV

| | Shaking Scale Value | Approximate Average Diameter of First Oil Droplets |
| --- | --- | --- |
| Inventive Composition (d) | 4 | 10$\mu$ |
| Inventive Composition ($d_1$) | 3 | 15$\mu$ |
| Comparative Composition (e) | 1 | — |

The diameters of first oil droplets were determined as follows: Portions of the unshaken continuous aqueous phase containing the stably suspended first oil droplets were diluted with water and were examined microscopically. Photomicrogrpahs showing first oil droplets were made and the oil droplet diameters were determined by direct measurement of numerous droplets on the photomicrogrpahs. These measurements were made of all the droplets in a randomly selected area judged to be representative of the droplet distribution. The approximate range of diameters for the first oil droplets of inventive composition (d) was 0.1 micron to 75 microns and the approximate range for inventive composition ($d_1$) was 0.1 to 150. These approximate ranges were evaluated at magnifications of 40$\times$ and 600$\times$.

Thus, even relatively small amounts of stably suspended first oil droplets greatly increase the dispersibility of the second oil phase into the aqueous phase upon shaking the composition. This is illustrated by Example II where the first oil component constituted only 1 wt. % of the total composition for inventive composition (c), yet which allowed virtually all of the upper oil to be dispersed in the aqueous phase upon fifteen seconds of shaking with the mechanical shaker. Further, Example III illustrates that an embodiment of the invention eliminated difficulties due to non-stabilized protein coagulation. Thus, the dressing or marinade compositions of the invention have an increased ease of mixing of the phases upon shaking, can be formulated with improved organoleptic characteristics, and yet may be formulated to revert to separated layers upon sufficient standing and thus, would be viewed by the consumer as being of the "Italian" or oil-and-vinegar type.

It is to be understood that while the invention has been described above in conjunction with preferred specific embodiments, the description and examples are intended to illustrate and not limit the scope of the invention, which is defined by the scope of the appended claims.

It is claimed:

1. A shakable, edible composition, useful as a dressing or marinade, comprising:
   a continuous aqueous phase, the continuous aqueous phase having stably suspended first oil droplets therein; and,
   a second oil phase, the second oil phase normally forming an upper layer contiguous with the continuous aqueous phase when the composition is in a container and prior to shaking, the second oil phase being dispersible into the aqueous phase as second oil droplets upon sufficient shaking of the composition when in a container.

2. The composition as in claim 1 wherein after shaking the second oil phase returns to form the separated layer upon sufficient standing when in a container while substantially leaving the first oil droplets in the continuous aqueous phase.

3. The composition as in claim 1 wherein the second oil droplets are large relative to the first oil droplets.

4. The composition as in claim 1 wherein the first oil droplets are maintained in suspension via one or more emulsifying or stabilizing agents.

5. The composition as in claim 1 wherein the first oil droplets are in an amount effective to increase the time for the second oil phase to return as a separated layer following shaking of the composition when in a container.

6. The composition as in claim 1 wherein the first oil droplets are in an amount effective to reduce the amount or duration of shaking needed to disperse the second oil phase into the continuous aqueous phase.

7. The composition as in claim 3 wherein the second oil droplets have an average diameter at or greater than about 75µ and the first oil droplets have an average diameter at or less than about 10µ.

8. The composition as in claim 1 wherein the continuous aqueous phase has a pH not greater than about 4.6.

9. The composition as in claim 5 or 6 wherein the first oil droplets constitute a first oil total of between about 0.5 wt. % to about 55 wt. % with respect to the continuous aqueous phase.

10. The composition as in claim 1 wherein the second oil droplets constitute a second oil total of between about 5 wt. % to about 55 wt. % with respect to the total composition.

11. The composition as in claim 8 wherein the composition further comprises one or more proteins and/or flavorings.

12. The composition as in claim 1 wherein the total combined oil from both the first oil droplets and the second oil phase constitute a total of between about 5 wt. % to about 75 wt. % with respect to the total composition.

13. The composition as in claim 8 wherein the continuous aqueous phase has a pH between about 3 and about 4.

14. The composition as in claim 9 wherein the first oil droplets constitute a first oil total of between about 2 wt. % to about 45 wt. % with respect to the continuous aqueous phase.

15. The composition as in claim 10 wherein the second oil droplets constitute a second oil total of between about 5 wt. % to about 50 wt. % with respect to the total composition.

16. The composition as in claim 12 wherein the total combined oil constitutes between about 5 wt. % to about 60 wt. % with respect to the total composition.

* * * * *